(12) United States Patent
Granström et al.

(10) Patent No.: US 9,881,051 B2
(45) Date of Patent: *Jan. 30, 2018

(54) PREVENTING ABUSE IN CONTENT SHARING SYSTEM

(71) Applicant: Google Inc., Mountain View, CA (US)

(72) Inventors: Johan Georg Granström, Zurich (CH); Alexandru Tudor, Birmensdorf (CH); Thomas Weich, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,745

(22) Filed: May 2, 2017

(65) Prior Publication Data
US 2017/0235787 A1    Aug. 17, 2017

Related U.S. Application Data

(63) Continuation of application No. 14/665,945, filed on Mar. 23, 2015, now Pat. No. 9,665,614.

(60) Provisional application No. 61/969,991, filed on Mar. 25, 2014.

(51) Int. Cl.
| | |
|---|---|
| *G06Q 40/00* | (2012.01) |
| *G06F 17/30* | (2006.01) |
| *G06F 21/10* | (2013.01) |
| *G06F 21/62* | (2013.01) |
| *H04L 29/06* | (2006.01) |
| *H04L 29/08* | (2006.01) |

(52) U.S. Cl.
CPC ........ *G06F 17/30386* (2013.01); *G06F 21/10* (2013.01); *G06F 21/6209* (2013.01); *H04L 63/102* (2013.01); *H04L 67/1085* (2013.01)

(58) Field of Classification Search
CPC ............... G06F 17/30386; G06F 21/10; G06F 21/6209; H04L 63/102; H04L 67/1085; H04L 2209/60
USPC .................. 235/379; 705/1.1; 726/26–32
See application file for complete search history.

(56) References Cited

U.S. PATENT DOCUMENTS

| | | | |
|---|---|---|---|
| 8,983,970 | B1 | 3/2015 | Osinga et al. |
| 2008/0178302 | A1 | 7/2008 | Brock et al. |
| 2008/0275763 | A1 | 11/2008 | Tran et al. |
| 2009/0165031 | A1 | 6/2009 | Li et al. |

(Continued)

OTHER PUBLICATIONS

Office Action dated May 24, 2016 in U.S. Appl. No. 14/665,945.

(Continued)

*Primary Examiner* — Laura Gudorf
(74) *Attorney, Agent, or Firm* — Byrne Poh LLP (57) ABSTRACT

The subject matter of this specification can be implemented in, among other things, a method that includes receiving, by a processing device, one or more first content items for one or more first user accounts of a content sharing system. The method further includes storing the first content items at the content sharing system. The method further includes receiving, by the processing device, a second content item for a second user account of the content sharing system. The method further includes comparing, by the processing device, the received second content item to the stored first content items to determine that the second content item is not exclusive to the second user account. The method further includes restricting a privilege of the second user account for the second content item in response to the determination that the second content item is not exclusive to the second user account.

18 Claims, 4 Drawing Sheets

(56) References Cited

U.S. PATENT DOCUMENTS

| | | |
|---|---|---|
| 2010/0228614 A1 | 9/2010 | Zhang et al. |
| 2011/0213720 A1 | 9/2011 | Waid et al. |
| 2012/0189212 A1 | 7/2012 | Ren et al. |
| 2014/0359786 A1 | 12/2014 | Lee et al. |

OTHER PUBLICATIONS

Office Action dated Nov. 22, 2016 in U.S. Appl. No. 14/665,945.
YouTube, "Block, Monetize, or Track Viewing Metrics", pp. 1-2, available at: http//web.archive.org/web/20120324154945/https://www.youtube.com/t/contentid, last accessed Mar. 23, 2015.
Notice of Allowance dated Feb. 7, 2017 in U.S. Appl. No. 14/665,945.

PREVENTING ABUSE IN CONTENT SHARING SYSTEM

CROSS-REFERENCE TO RELATED APPLICATIONS

This application is a continuation of U.S. patent application Ser. No. 14/665,945, filed on Mar. 23, 2015, which claims the benefit of U.S. Provisional Patent Application No. 61/969,991, filed on Mar. 25, 2014, each of which is hereby incorporated by reference herein in its entirety.

TECHNICAL FIELD

This instant specification relates to preventing abuse related to non-exclusive content in a content sharing system.

BACKGROUND

A content hosting service allows individuals to upload content (e.g., text, audio, and/or video) to share with others on a website. A user may, for example, upload via the hosting service's website, mobile app, desktop applications, or through application program interfaces (APIs). The hosting service then stores the content on its servers and provides the content to devices of other users that request the content.

SUMMARY

In one aspect, a method includes receiving, by a processing device, one or more first content items for one or more first user accounts of a content sharing system. The method further includes storing the first content items at the content sharing system. The method further includes receiving, by the processing device, a second content item for a second user account of the content sharing system. The method further includes comparing, by the processing device, the received second content item to the stored first content items to determine that the second content item is not exclusive to the second user account. The method further includes restricting a privilege of the second user account for the second content item in response to the determination that the second content item is not exclusive to the second user account.

Implementations can include any, all, or none of the following features. One or more of the first content items or the second content item can include video. Restricting the privilege can include denying uploading of the second content item by the second user account where the second content item includes long content, high resolution content, or high bandwidth content. Restricting the privilege can include denying live streaming of the second content item by the second user account. Restricting the privilege can include denying annotations within the second content item by the second user account. Restricting the privilege can include denying links to an online market within the second content item by the second user account. Restricting the privilege can include denying monetization of the second content item by the second user account. Restricting the privilege can include denying multiple audio or subtitle tracks in the second content item by the second user account. Restricting the privilege can include denying promotion of the second content item by the second user account in search results. Restricting the privilege can include denying selective regional availability of the second content item by the second user account. Restricting the privilege can include denying promotion of comments for the second content item by the second user account. Restricting the privilege can include denying editing of the second content item by the second user account. The method can include receiving a request from the second user account to exercise the privilege for the second content item. The method can further include comparing the received second content item to the stored first content items in response to receiving the request. The method can include receiving, by the processing device, a third content item for the second user account. The method can further include restricting a privilege of the second user account for the third content item without comparing the third content item to the stored first content items. The method can include determining that a threshold number of content items for the second user account have been received that are not exclusive to the second user account and for which requests to exercise the privilege have been received. The threshold number of content items can include at least the second content item. The method can further include restricting the privilege of the second user account for the third content item in response to the determination that the threshold number of content items for the second user account has been received. Comparing the received second content item to the stored first content items to determine that the second content item is not exclusive to the second user account can include determining that a particular amount of the second content item that matches content in the stored first content items exceeds a threshold amount or that a degree of similarity of a portion of the second content item to content in the stored first content items exceeds a threshold degree of similarity.

In one aspect, a non-transitory computer-readable medium having instructions stored thereon that, when executed by a processing device, cause the processing device to perform operations including receiving, by the processing device, one or more first content items for one or more first user accounts of a content sharing system. The operations further include storing the first content items at the content sharing system. The operations further include receiving, by the processing device, a second content item for a second user account of the content sharing system. The operations further include comparing, by the processing device, the received second content item to the stored first content items to determine that the second content item is not exclusive to the second user account. The operations further include restricting a privilege of the second user account for the second content item in response to the determination that the second content item is not exclusive to the second user account.

Implementations can include any, all, or none of the following features. One or more of the first content items or the second content item can include video. Restricting the privilege can include denying uploading of the second content item by the second user account where the second content item includes long content, high resolution content, or high bandwidth content. Restricting the privilege can include denying live streaming of the second content item by the second user account. Restricting the privilege can include denying annotations within the second content item by the second user account. Restricting the privilege can include denying links to an online market within the second content item by the second user account. Restricting the privilege can include denying monetization of the second content item by the second user account. Restricting the privilege can include denying multiple audio or subtitle tracks in the second content item by the second user account. Restricting the privilege can include denying promotion of the second content item by the second user account in search results. Restricting the privilege can include denying selective regional availability of the second content item by the second user account. Restricting the privilege can include denying promotion of comments for the second content item by the second user account. Restricting the privilege can include denying editing of the second content item by the second user account. The operations can further include receiving a request from the second user account to exercise the privilege for the second content item. The operations can further include comparing the received second content item to the stored first content items in response to receiving the request. The operations can further include receiving, by the processing device, a third content item for the second user account. The operations can further include restricting a privilege of the second user account for the third content item without comparing the third content item to the stored first content items. The operations can further include determining that a threshold number of content items for the second user account have been received that are not exclusive to the second user account and for which requests to exercise the privilege have been received. The threshold number of content items can include at least the second content item. The operations can further include restricting the privilege of the second user account for the third content item in response to the determination that the threshold number of content items for the second user account has been received. Comparing the received second content item to the stored first content items to determine that the second content item is not exclusive to the second user account can include determining that a particular amount of the second content item that matches content in the stored first content items exceeds a threshold amount or that a degree of similarity of a portion of the second content item to content in the stored first content items exceeds a threshold degree of similarity.

In one aspect, a system includes an interface to receive one or more first content items for one or more first user accounts of a content sharing system and a second content item for a second user account of the content sharing system. The system further includes a memory to store the first content items. The system further includes a processing device to compare the received second content item to the stored first content items to determine that the second content item is not exclusive to the second user account and, in response, to restrict a privilege of the second user account for the second content item.

Implementations can include any, all, or none of the following features. One or more of the first content items or the second content item can include video. The processing device can be further to restrict the privilege by denying uploading of the second content item by the second user account where the second content item includes long content, high resolution content, or high bandwidth content. The processing device can be further to restrict the privilege by denying live streaming of the second content item by the second user account. The processing device can be further to restrict the privilege by denying annotations within the second content item by the second user account. The processing device can be further to restrict the privilege by denying links to an online market within the second content item by the second user account. The processing device can be further to restrict the privilege by denying monetization of the second content item by the second user account. The processing device can be further to restrict the privilege by denying multiple audio or subtitle tracks in the second content item by the second user account. The processing device can be further to restrict the privilege by denying promotion of the second content item by the second user account in search results. The processing device can be further to restrict the privilege by denying selective regional availability of the second content item by the second user account. The processing device can be further to restrict the privilege by denying promotion of comments for the second content item by the second user account. The processing device can be further to restrict the privilege by denying editing of the second content item by the second user account. The interface can be further to receive a request from the second user account to exercise the privilege for the second content item. The processing device can be further to compare the received second content item to the stored first content items in response to receiving the request. The interface can be further to receive a third content item for the second user account and the processing device can be further to determine that a threshold number of content items for the second user account have been received that are not exclusive to the second user account and for which requests to exercise the privilege have been received. The threshold number of content items can include at least the second content item. The processing device can be further to restrict a privilege of the second user account for the third content item in response to the determination that the threshold number of content items for the second user account have been received without a comparison of the third content item to the stored first content items. The processing device can be further to compare the received second content item to the stored first content items to determine that the second content item is not exclusive to the second user account by determining that a particular amount of the second content item that matches content in the stored first content items exceeds a threshold amount or that a degree of similarity of a portion of the second content item to content in the stored first content items exceeds a threshold degree of similarity.

The details of one or more implementations are set forth in the accompanying drawings and the description below. Other features and advantages will be apparent from the description and drawings, and from the claims.

DETAILED DESCRIPTION

This document describes systems and techniques for preventing abuse related to non-exclusive content in a content sharing system. A user may upload content, such as text, audio, and/or video, to the content sharing system. The user may then request that a privilege be exercised with respect to the content. For example, privileges may include uploading long content (e.g., a video longer than fifteen minutes), allowing live streaming of content, uploading and/or streaming high resolution and/or bandwidth content, allowing annotations within content, allowing links to an online market within content, allowing monetization of content using advertisements, allowing multiple audio tracks in video content, allowing one or more subtitle tracks in video content, providing promotion and/or surfacing of content in search results, enabling selective regional availability of content, providing promotion of comments for content, and allowing editing of content. The content sharing system may prevent abuse by preventing the user from exercising or restricting the user's exercise of the privilege for content that is not exclusive to the user, such as content that has already been uploaded by one or more other users of the content sharing system. In some implementations, restricting the privileges does not include restricting presentation of the content.

The systems and techniques described here may provide one or more of the following advantages. First, a system can provide for preventing abuse related to non-exclusive content in a content sharing system by matching a user's content with content of other users to determine that the user's content was previously upload by another user. Second, a system can provide for preventing abuse related to non-exclusive content in a content sharing system by determining that a user has previously uploaded and attempted to exercise a privilege for content that was not exclusive to the user. Third, a system can provide for preventing abuse related to non-exclusive content in a content sharing system by matching a user's content with content of other users, where content from the user and/or the other users is not subject to copyright or is in the public domain.

Figure 1:
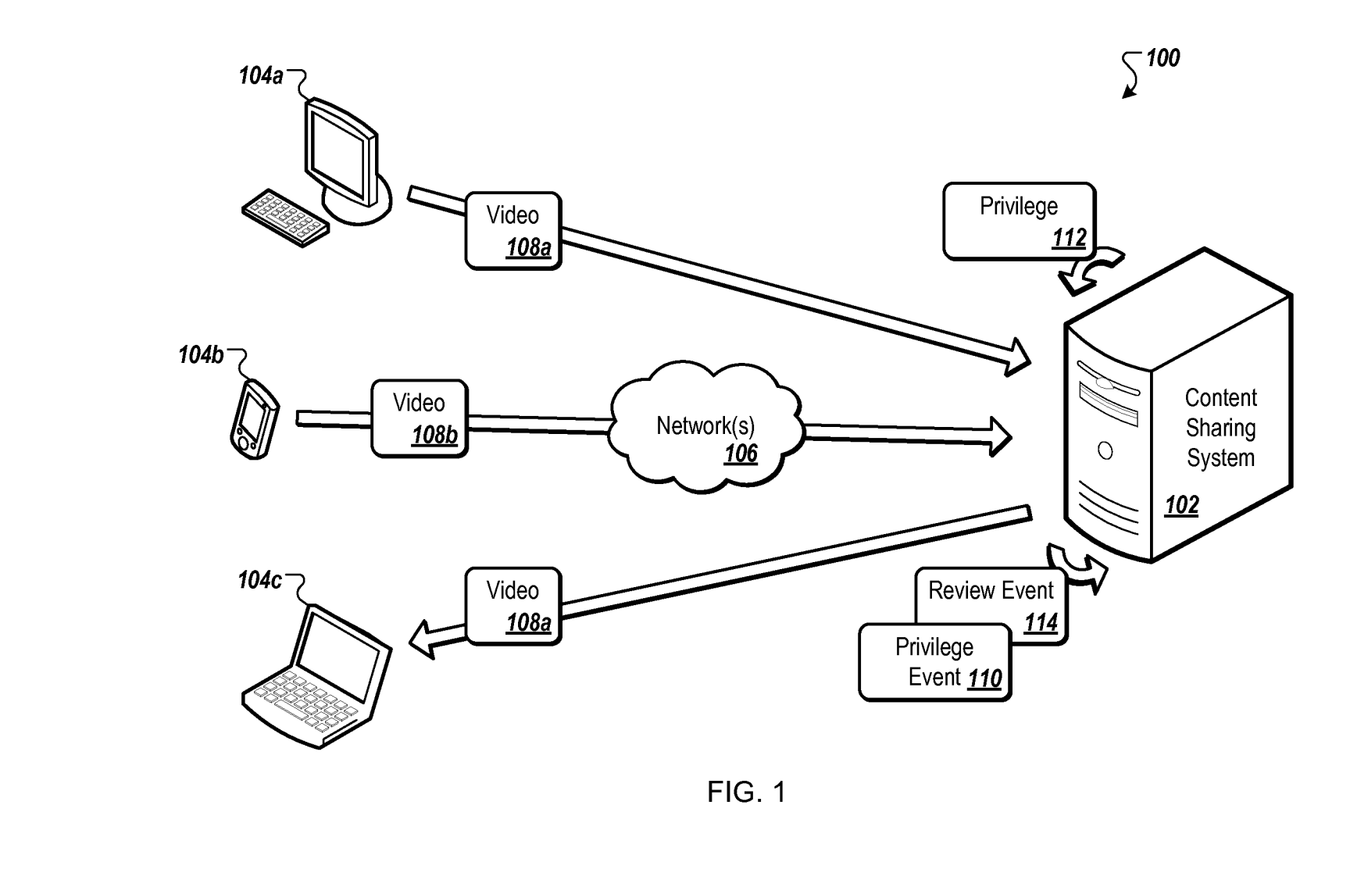
FIG. 1 is a schematic diagram that shows an example of a system for preventing abuse related to non-exclusive content in a content sharing system.

FIG. 1 is a schematic diagram that shows an example of a system 100 for preventing abuse related to non-exclusive content in a content sharing system 102. The system 100 includes multiple computer devices 104a-c in communication with the content sharing system 102 over one or more networks 106, such as a local network, a wide network, and/or one or more of the computer devices that make up the Internet. The computer devices 104a-c may include, for example, desktop computers, laptop computers, and/or mobile devices, such as smartphones. The content sharing system 102 includes one or more computer devices that may include, processing devices, storage devices, and network interfaces.

A first user at the first computer device 104a may upload content, such as a first video 108a, from the first computer device 104a to an account of the first user at the content sharing system 102. The first user may then make the first video 108a available to other users and/or computer devices. For example, the first user at the first computer device 104a may send a command to the content sharing system 102 to publish the first video 108a, e.g., to particular users, devices, and/or to the general public. The first user may also send a request to the content sharing system 102 to exercise a privilege 112 for the content, or the first user may provide an indication that the privilege 112 for the content is allowed (e.g., by setting a property or indicator of the content).

As an example of a privilege, the user at the first computer device 104a may request that a large content item be uploaded to the content sharing system 102, (e.g., the first video 108a may be longer than fifteen minutes or larger than a particular number of bytes). In another example, the user at the first computer device 104a may request that the first video 108a be streamed live to other users. In another example, the user at the first computer device 104a may request that the first video 108a, which has a high resolution and/or bandwidth usage, be uploaded and/or streamed. The user at the first computer device 104a may also request that annotations be presented within the first video 108a or that links to an online market be allowed within the first video 108a. The user at the first computer device 104a may request that multiple audio tracks and/or one or more subtitle tracks be included in the first video 108a. In yet another example, the user at the first computer device 104a may send a request to the content sharing system 102 that the first video 108a be promoted and/or surfaced by the content sharing system 102 or another system within search results. The user at the first computer device 104a may also request that selective regional availability be enabled for the first video 108a.

In the case of monetizing content with advertisements, the content sharing system 102, or another system (e.g., an ad server), may select advertisements for presentation in conjunction with the first user's content, such as beside the content, on top of the content, within the content, before playing the content, after playing the content, and/or in the middle of playing the content. For content that the first user has selected for monetization, the content sharing system 102 may credit the account of the first user after presenting the content along with an advertisement to another user. In some implementations, the first user may later send a request to the content sharing system 102 to stop monetizing the first video 108a.

After the request to exercise the privilege, a third user at the third computer device 104c may send a request from the third computer device 104c to the content sharing system 102 for presentation of the first video 108a. The content sharing system 102 determines that the third user is allowed to access the first video 108a, such as by the first user sharing the first video 108a specifically with the third user, with a group of users to which the third user belongs, or generally with anyone. The content sharing system 102 then provides the first video 108a to the third computer device 104c.

The content sharing system 102 determines that the first user has requested that the privilege 112 be exercised for the first video 108a. The content sharing system 102 generates a privilege event 110 in response to sending the first video 108a to the third computer device 104c. Alternatively, the content sharing system 102 may generate the privilege event 110 in response to the request that the privilege 112 be exercised. For example, in the case of a large content item or streaming a content item, the content sharing system 102 may generate the privilege event 110 in response to the user at the first computer device 104a uploading the first video 108a. In another example, where the user modifies the content item (e.g., by adding annotations or links), the content sharing system 102 may generate the privilege event 110 in response to the user at the first computer device 104a requesting the modification the first video 108a.

In response to the privilege event 110, the content sharing system 102 determines whether to actually exercise the privilege for the first video 108a. The content sharing system 102 bases the determination on whether the first video 108a is exclusive to the account of the first user. The content sharing system 102 may determine whether the first video 108a is exclusive to the account of the first user prior to providing the first video 108a to the third computer device 104c. In response to determining that the first user has requested that the privilege be exercised for the first video 108a and that the first video 108a is exclusive to the first user account, the content sharing system 102 then exercises the privilege. For example, the user at the first computer device 104a may request that the first video 108a be live streamed. The content sharing system 102 may determine that the first video 108a is exclusive to the account of the user at the first computer device 104a when the user uploads the first video 108a, when the user requests that live streaming be enabled for the first video 108a, and/or when the user at the third computer device 104c downloads the first video 108a for live streaming.

In the case of monetizing content with advertisements, the content sharing system 102 provides an advertisement to the third computer device 104c for presentation in conjunction with the first video 108a. The content sharing system 102 generates the privilege event 110 in response to sending the first video 108a and/or the advertisement to the third computer device 104c. In response to the privilege event 110, the content sharing system 102 determines whether to credit the account of the first user with the privilege 112 for presentation of the advertisement at the third computer device 104c. The content sharing system 102 bases the determination on whether the first video 108a is exclusive to the account of the first user. Alternatively, the content sharing system 102 may determine whether the first video 108a is exclusive to the account of the first user prior to providing the advertisement. In response to determining that the first user has requested monetization for the first video 108a and that the first video 108a is exclusive, the content sharing system 102 then provides the advertisement to the third computer device 104c.

Prior to determining whether the first video 108a is exclusive to the first user account, a second user at the second computer device 104b may upload a second video 108b from the second computer device 104b to the content sharing system 102. The content sharing system 102 receives the second video 108b and stores the second video 108b at the content sharing system 102. Then, after receiving the first video 108a, the content sharing system 102 compares the first video 108a to the second video 108b. The content sharing system 102 may also compare the first video 108a to one or more other videos received and/or stored at the content sharing system 102 prior to the first video 108a. If the content sharing system 102 determines that the first video 108a matches the second video 108b or another video received and/or stored at the content sharing system 102 prior to the first video 108a, then the first video 108a is not exclusive to the account of the first user. Accordingly, the content sharing system 102 restricts the privilege 112 of the account of the first user for the first video 108a.

In one example, the content sharing system 102 performs the comparison when the privilege event 110 occurs for the first video 108a, such as when live streaming the first video 108a, presenting an advertisement in conjunction with presenting the first video 108a, proving selective regional availability for the first video 108a, or streaming a high resolution version of the first video 108a. In another example, the content sharing system 102 performs the comparison when the first user requests that the privilege be exercised for the first video 108a. This may be when the first user uploads the first video 108a, such as when uploading a long and/or high resolution version of the first video 108a, or sometime after uploading the first video 108a, such as when the user attempts to edit the first video 108a and/or annotate or add links to the first video 108a. In another example, the content sharing system 102 performs the comparison in response to a review event 114, such as when the first video 108a reaches a particular milestone (e.g., a threshold amount of views, revenue, comments, and/or likes for the first video 108a).

In situations in which the systems discussed here collect personal information about users, or may make use of personal information, the users may be provided with an opportunity to control whether the content sharing system 102 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing system 102.

Figure 2:
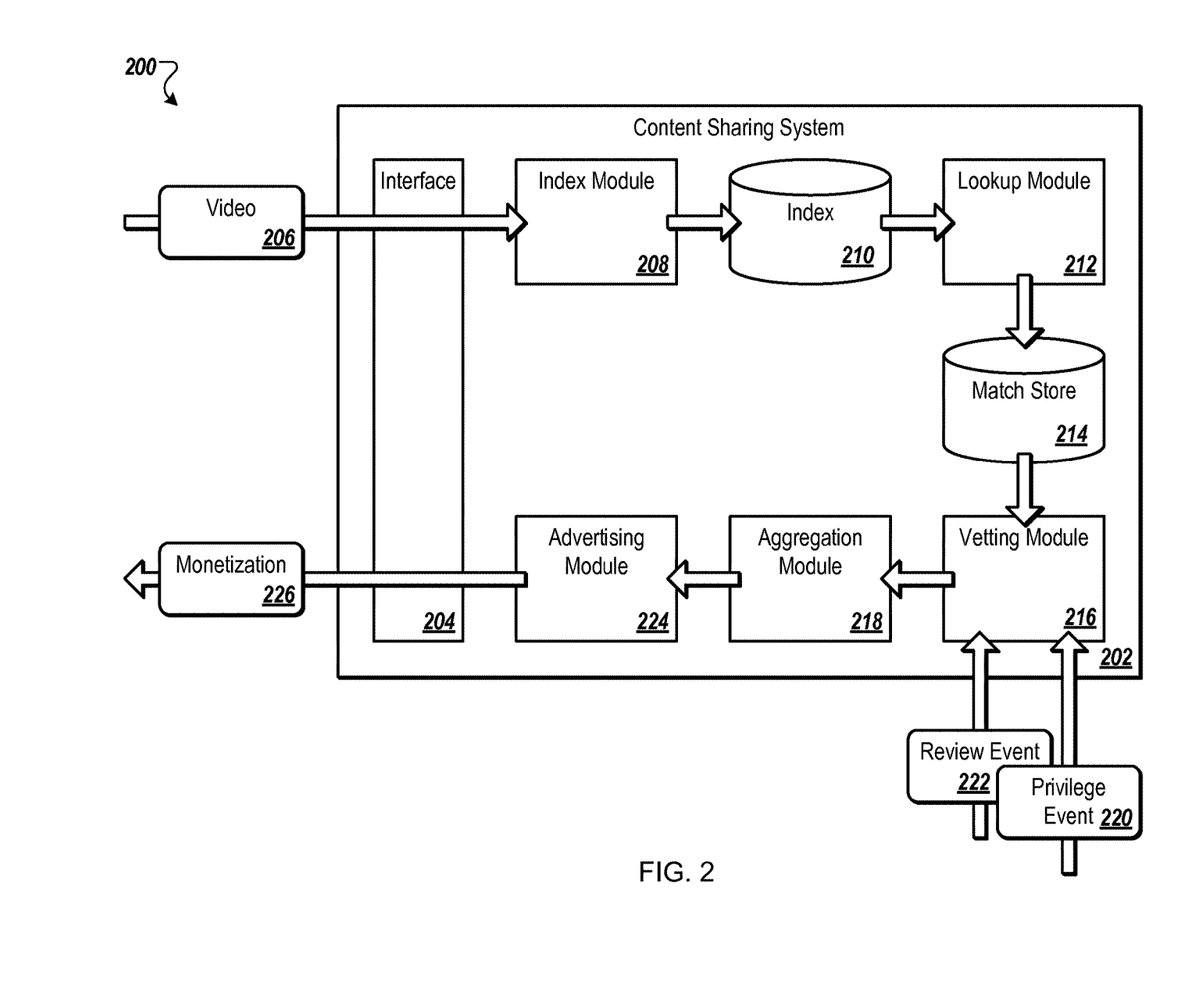
FIG. 2 is a block diagram that shows an example of a system for preventing abuse related to non-exclusive content in a content sharing system.

FIG. 2 is a block diagram that shows an example of a system 200 for preventing abuse related to non-exclusive content in a content sharing system 202. The content sharing system 202 includes an interface 204 that receives a video 206. The interface 204 may provide communication with a network over which the video 206 is received as well as a user interface with which an end user uploads the video 206, such as a web-based user interface.

The content sharing system 202 also includes an index module 208 that stores the video 206 along with previously received videos in an index 210. The index module 208 may prepare the video 206 for storage in the index 210 by converting the video 206 into a particular format used for searching the index 210. The index module 208 may also store metadata associated with the video 206 in the index 210, such as a name of the video 206, tags for the video 206, and sharing options for the video 206.

The content sharing system 202 also includes a lookup module 212. The lookup module 212 compares the video 206 to other previously received videos in the index 210. If the lookup module 212 finds any matches between the video 206 and the previously received videos, then the lookup module 212 may store the identified matches in a match store 214. In some implementations, the lookup module 212 may compare the videos at some point after the videos have been uploaded (e.g., later when the user requests that the privilege be exercised). In which case, the lookup module 212 may compare the time and date at which the videos were uploaded to determine which video in a set of matching videos was uploaded first.

The lookup module 212 or another module may perform a lookup for copyright verification. In some implementations, the content sharing system 202 uses the matches identified by the lookup module 212 and stored in the match store 214 for identifying both the exclusivity of the video 206 and any possible copyright violation caused by the video 206. In addition, the content sharing system 202 may identify videos for exclusivity independently of whether the videos participate in the copyright protection process. For example, one or more of the videos in the index 210 and/or the videos identified in the match store 214 may include videos that are not participating in the copyright protection process, but that are still compared to one another to determine exclusivity.

The content sharing system 202 further includes a vetting module 216. The vetting module 216 determines whether to restrict a privilege of the user account for the video 206 based on whether the video 206 is exclusive to the user account (e.g., whether a match between the video 206 and any previously received videos was identified). In a set of matching videos, the vetting module 216 may identify the videos that were received after the first video in the set as non-exclusive. The vetting module 216 then restricts a privilege of the user account for the non-exclusive videos.

In some implementations, the vetting module 216 may restrict a privilege when a strength and/or length of similarity between a portion of the video 206 and a portion of another video are above a particular threshold. In one example, the vetting module 216 may restrict a privilege when a match is made between video (and/or audio within the video 206) and the other video. In some implementations, the vetting module 216 may restrict a privilege based on a combination of the length and strength of the match. For example, the vetting module 216 may restrict a privilege when a short portion matches almost exactly (e.g., a one minute portion matches almost exactly) or when a longer portion is less than an exact match but very similar (e.g., a five minute portion that is very similar). In another example, the vetting module 216 may restrict a privilege based on at least a particular percentage of the video 206 matching another video (e.g., about 50%, 60%, 70%, 80%, or 90%). The vetting module 216 may apply a one-way match or a two-way match. For example in a one-way match, the vetting module 216 may restrict a privilege when a particular percentage of one of the videos matches the other (e.g., when either the particular percentage of the video 206 matches some portion of the other video or the particular percentage of the other video matches some portion of the video 206). In a two-way match, the vetting module 216 may restrict a privilege when a particular percentage of both of the videos match the other (e.g., the particular percentage of the video 206 matches some portion of the other video and the particular percentage of the other video matches some portion of the video 206).

The vetting module 216 and/or the lookup module 212 may ignore previously received videos from the same user account as the video 206 when finding matches to the video 206. In some implementations, the vetting module 216 and/or the lookup module 212 may associate multiple accounts with one another that are administered by the same person or entity. The vetting module 216 and/or the lookup module 212 may then ignore previously received videos from the associated accounts when finding matches to the video 206.

The content sharing system 202 also includes an aggregation module 218. The aggregation module 218 aggregates the number of videos for which each user account has attempted to exercise a privilege that were identified by the vetting module 216 as non-exclusive. If the aggregation module 218 determines that the other videos for an account have an aggregate number of attempts for non-exclusive videos that is above a particular threshold (e.g., five, ten, or twenty videos), then the aggregation module 218 may restrict a privilege for a subsequent video even though the subsequent video has not been restricted by the vetting module 216 for non-exclusivity.

In some implementations, the content sharing system 202 may combine the aggregate number of attempts for non-exclusive videos from the aggregation module 218 with the length and similarity matching information from the vetting module 216 to determine an overall score for the video 206. The content sharing system 202 may then determine whether to restrict a privilege for the video 206 based on the overall score of the video 206. For example, the content sharing system 202 may determine whether the overall score of the video 206 is above a particular threshold and if so, then the content sharing system 202 restricts a privilege of the user account for the video 206.

The vetting module 216 and/or the aggregation module 218 may perform their respective operations in response to a privilege event 220 or a review event 222. For example, the content sharing system 202 may receive a request to present the video 206 at a computer device. In the case where the privilege includes monetization of content with advertisements, the content sharing system 202 may include an advertising module 224 that presents an advertisement in conjunction with the presentation of the video 206 at the computer device. The advertising module 224, or another module acting in concert with the presentation of the video 206, causes generation of the privilege event 220 in response to the request for presentation of the advertisement at the computer device. Alternatively, the content sharing system 202 may generate the privilege event 220 in response to receiving the request to exercise the privilege for the video 206. The vetting module 216 and/or the aggregation module 218 then evaluate the video 206 for exclusivity and credit an account of the user with a monetization 226 if the video 206 is determined to be exclusive to the account of the user. In another example, the vetting module 216 and/or the aggregation module 218 may perform their respective operations in response to the review event 222. The content sharing system 202 may initiate the review event 222, for example, when the video 206 reaches a threshold amount of views, revenue, comments, and/or likes.

In some implementations, the content sharing system 202 provides a process for appealing the automatic determination of non-exclusivity. For example, the content sharing system 202 may provide a user interface for submitting evidence that the video 206 is exclusive to the user account. In response to receiving information that shows the video 206 is exclusive to the user account, the content sharing system 202 may then allow the user account to exercise the privilege for the video 206. In addition, the content sharing system 202 may restrict a privilege of other user accounts that may be exercising the privilege for the video 206.

Figure 3:
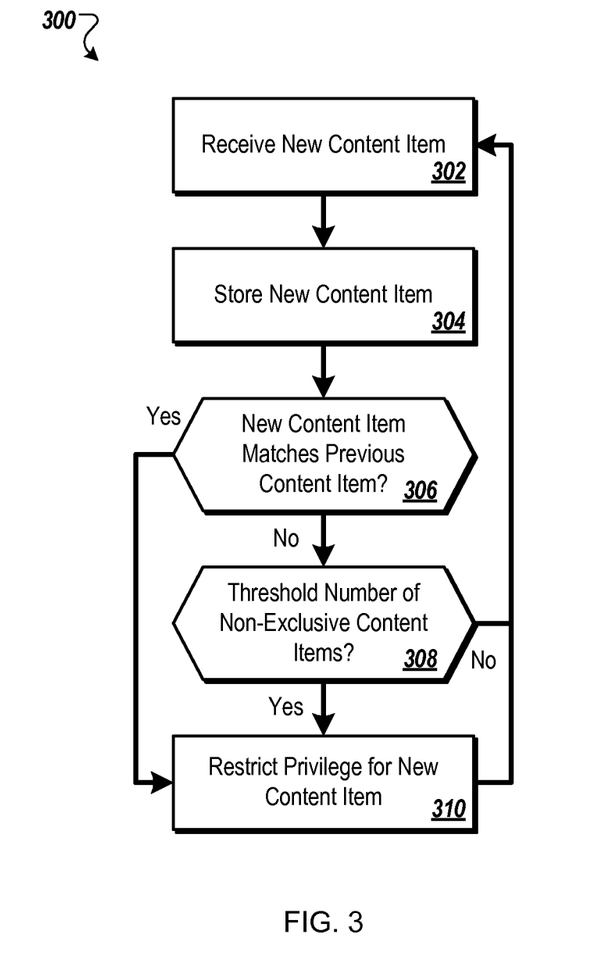
FIG. 3 is flow chart that shows an example of a process for preventing abuse related to non-exclusive content in a content sharing system.

FIG. 3 is a flow chart that shows an example of a process 300 for preventing abuse related to non-exclusive content in a content sharing system. The process 300 may be performed, for example, by a system such as the systems 100 and 200. For clarity of presentation, the description that follows uses the systems 100 and 200 as examples for describing the process 300. However, another system, or combination of systems, may be used to perform the process 300.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

The process 300 begins, at block 302, with receiving, at a content sharing system, a new content item for a user account of the content sharing system. In some implementations, the new content item may include video. In some implementations, the new content item does not participate in a copyright protection process. For example, the interface 204 may receive content items, such as the video 206, from computer devices, such as the first computer device 104a and the second computer device 104b.

At block 304, the process 300 includes storing the new content item at the content sharing system. For example, the index module 208 may store received content items, such as the video 206, in the index 210.

At block 306, the process 300 includes comparing the new content item to one or more other content items previously received and stored at the content sharing system to determine whether the new content item is exclusive to the user account. In some implementations, comparing the new content item to the stored content items includes determining that a particular amount of the new content item that matches content in the stored content items exceeds a threshold amount or that a degree of similarity of a portion of the new content item to content in the stored content items exceeds a threshold degree of similarity. For example, the lookup module 212 may compare the content items in the index 210 to identify matches and then store the identified matches in the match store 214.

If the new content item is not exclusive to the user account, then at block 310, the process 300 includes restricting a privilege of the user account for the new content item. For example, the vetting module 216 may restrict a privilege of a first account for the video 206 that uploaded the video 206 in response to determining that the video 206 is not exclusive to the first user account.

If the new content item is exclusive to the user account, then at block 308, the process 300 includes determining whether a threshold number of content items from the user account have been received that are not exclusive to the user account and for which a request to exercise a privilege has been received. If the threshold number of content items has been received, then the process 300 proceeds to block 310 which includes restricting a privilege of the user account for the new content item. For example, the aggregation module 218 may restrict a privilege of the first user account for the video 206 in response to determining that the first user has attempted to exercise a privilege for a threshold number of other videos that were identified as not exclusive to the first user account.

Otherwise, if the threshold number of content items has not been received, then the process 300 returns to block 302 which includes receiving another content item. In some implementations, the process 300 includes receiving a request to exercise a privilege of the new content item. The process 300 may then include performing operations of blocks 306 and/or 308 in response to receiving the request to exercise the privilege of the new content item. In some implementations, one or more of the operations of the process 300 may be performed in another order or concurrently. For example, block 308 may be performed before block 306. In some implementations, restricting a privilege of the user account for the new content item as a result of block 308 may occur without comparing the new content item to the stored content items in block 306.

Figure 4:
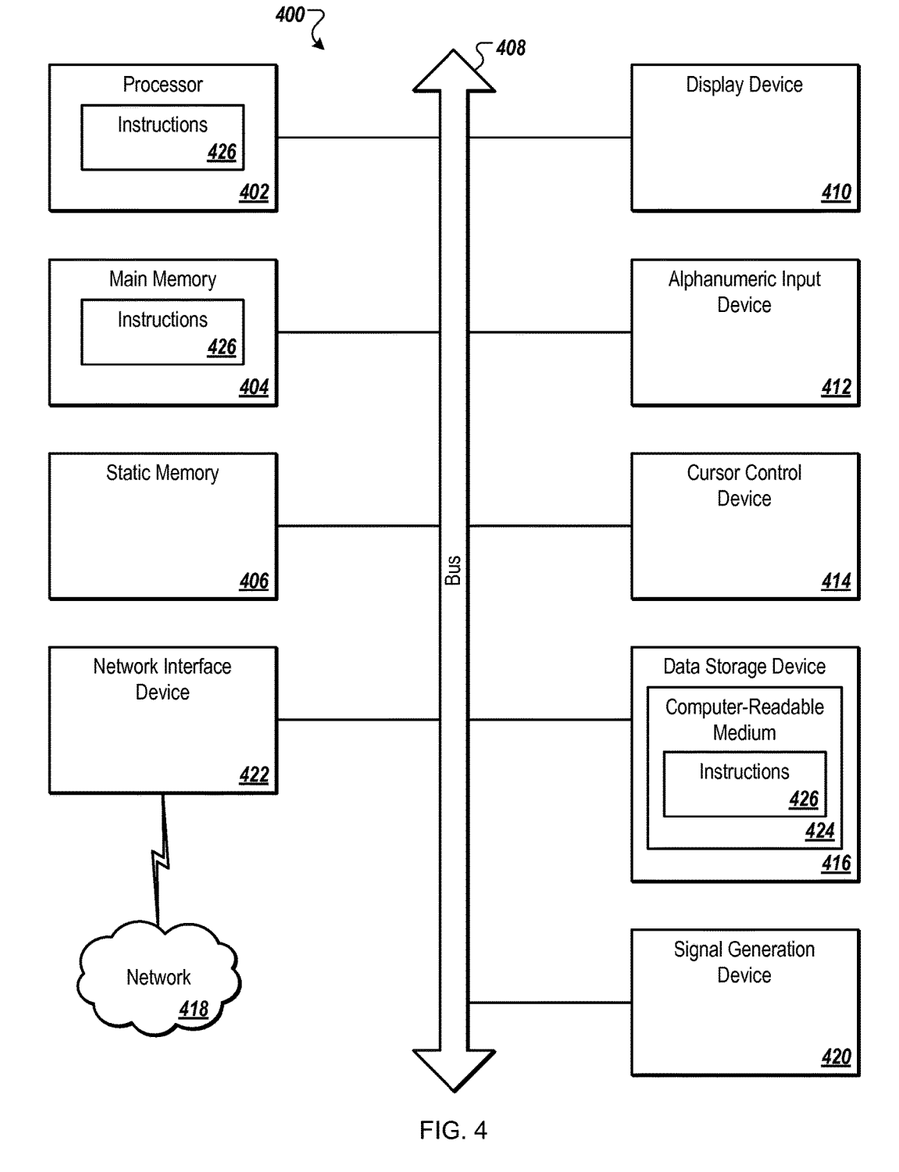
FIG. 4 is a schematic diagram that shows an example of a computing system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the content sharing system 102 for performing the operations discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the content sharing system 102 embodying any one or more of the methodologies or functions described herein. The sets of instructions 426 of the content sharing system 102 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium"

can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method for identifying matching content items, the method comprising:
   receiving, by a processing device, a first content item uploaded by a first user account to a content sharing system for presentation to users of the content sharing system;
   storing, by the processing device, the first content item at the content sharing system;
   receiving, by the processing device, a second content item uploaded by a second user account to the content sharing system for presentation to users of the content sharing system;
   determining, by the processing device, that the second user account is not included in a group of user accounts that are administered by an entity associated with the first user account;
   in response to determining that the second user account is not included in the group of user accounts that are administered by the entity associated with the first user account, comparing, by the processing device, the received second content item to the stored first content item to determine that the second content item is not exclusive to the second user account within the content sharing system; and
   restricting, by the processing device, a privilege of the second user account for the second content item in response to the determination that the second content item is not exclusive to the second user account.

2. The method of claim 1, wherein restricting the privilege of the second user account includes blocking a live stream of the second content item.

3. The method of claim 1, further comprising:
   receiving a request to view the second content item from a user device associated with a third user account;
   determining whether to present the second content item on the user device associated with the third user account based on a location associated with the third user account.

4. The method of claim 1, wherein comparing the second content item to the stored first content item comprises determining a degree of similarity between the second content item and the first content item.

5. The method of claim 1, further comprising:
   causing a user interface that indicates that the second content item has been determined to be not exclusive to the second user account to be presented;

receiving, via the user interface, an indication that the privilege of the second user account is to be exercised; and in response to receiving the indication, allowing the privilege to be exercised by the second user account.

6. The method of claim 1, further comprising storing an indication that the second content item has been determined to be not exclusive to the second user account.

7. A system for identifying matching content items, the system comprising:
a hardware processor that is programmed to:
receive a first content item uploaded by a first user account to a content sharing system for presentation to users of the content sharing system;
store the first content item at the content sharing system;
receive a second content item uploaded by a second user account to the content sharing system for presentation to users of the content sharing system;
determine that the second user account is not included in a group of user accounts that are administered by an entity associated with the first user account;
in response to determining that the second user account is not included in the group of user accounts that are administered by the entity associated with the first user account, compare the received second content item to the stored first content item to determine that the second content item is not exclusive to the second user account within the content sharing system; and
restrict a privilege of the second user account for the second content item in response to the determination that the second content item is not exclusive to the second user account.

8. The system of claim 7, wherein restricting the privilege of the second user account includes blocking a live stream of the second content item.

9. The system of claim 7, wherein the hardware processor is further programmed to:
receive a request to view the second content item from a user device associated with a third user account;
determine whether to present the second content item on the user device associated with the third user account based on a location associated with the third user account.

10. The system of claim 7, wherein comparing the second content item to the stored first content item comprises determining a degree of similarity between the second content item and the first content item.

11. The system of claim 7, wherein the hardware processor is further programmed to:
cause a user interface that indicates that the second content item has been determined to be not exclusive to the second user account to be presented;
receive, via the user interface, an indication that the privilege of the second user account is to be exercised; and
in response to receiving the indication, allow the privilege to be exercised by the second user account.

12. The system of claim 7, wherein the hardware processor is further programmed to store an indication that the second content item has been determined to be not exclusive to the second user account.

13. A non-transitory computer-readable medium containing computer executable instructions that, when executed by a processor, cause the processor to perform a method for identifying matching content items, the method comprising:
receiving a first content item uploaded by a first user account to a content sharing system for presentation to users of the content sharing system;
storing the first content item at the content sharing system;
receiving a second content item uploaded by a second user account to the content sharing system for presentation to users of the content sharing system;
determining that the second user account is not included in a group of user accounts that are administered by an entity associated with the first user account;
in response to determining that the second user account is not included in the group of user accounts that are administered by the entity associated with the first user account, comparing the received second content item to the stored first content item to determine that the second content item is not exclusive to the second user account within the content sharing system; and
restricting a privilege of the second user account for the second content item in response to the determination that the second content item is not exclusive to the second user account.

14. The non-transitory computer-readable medium of claim 13, wherein restricting the privilege of the second user account includes blocking a live stream of the second content item.

15. The non-transitory computer-readable medium of claim 13, wherein the method further comprises:
receiving a request to view the second content item from a user device associated with a third user account;
determining whether to present the second content item on the user device associated with the third user account based on a location associated with the third user account.

16. The non-transitory computer-readable medium of claim 13, wherein comparing the second content item to the stored first content item comprises determining a degree of similarity between the second content item and the first content item.

17. The non-transitory computer-readable medium of claim 13, wherein the method further comprises:
causing a user interface that indicates that the second content item has been determined to be not exclusive to the second user account to be presented;
receiving, via the user interface, an indication that the privilege of the second user account is to be exercised; and
in response to receiving the indication, allowing the privilege to be exercised by the second user account.

18. The non-transitory computer-readable medium of claim 13, wherein the method further comprises storing an indication that the second content item has been determined to be not exclusive to the second user account.

* * * * *